(12) United States Patent
Shiomi

(10) Patent No.: US 6,707,955 B1
(45) Date of Patent: Mar. 16, 2004

(54) IMAGE SENSING DEVICE, IMAGE PROCESSING APPARATUS AND METHOD, AND MEMORY MEDIUM

(75) Inventor: Yasuhiko Shiomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 661 days.

(21) Appl. No.: 09/603,629

(22) Filed: Jun. 26, 2000

(30) Foreign Application Priority Data

Jun. 30, 1999 (JP) ............................................ 11-186876

(51) Int. Cl.[7] .............................. G06K 7/00; G06K 9/20
(52) U.S. Cl. ....................................................... 382/312
(58) Field of Search ................................ 382/254, 274, 382/275, 312–315; 358/207.99, 221.1, 231.4, 239.1, 241, 250–252, 264, 272, 273, 448, 450–452, 431.1, 441, 561, 562, 581, 611, 612, 615, 616, 619, 620, 625, 628, 629, 630, 674, 675, 701, 909

(56) References Cited

U.S. PATENT DOCUMENTS 3,743,772 A   7/1973  Pieters et al.
4,979,042 A  12/1990  Vogel
5,157,497 A * 10/1992  Topper et al. ............... 348/615
5,408,267 A *  4/1995  Main ........................... 348/254
5,493,334 A *  2/1996  Zortea et al. ................ 348/243
5,528,292 A *  6/1996  Ikeda ....................... 348/222.1
5,917,554 A *  6/1999  Ohta ........................... 348/581

FOREIGN PATENT DOCUMENTS

EP          0501075       2/1992
JP          08287245     11/1996
JP          09130603      5/1997

* cited by examiner

Primary Examiner—Jose L. Couso
(74) Attorney, Agent, or Firm—Morgan & Finnegan, LLP

(57) ABSTRACT

An image sensing device of this invention corrects sensitivity nonuniformity of an image sensing element. This image sensing device has an image sensing element (5) having a two-dimensional matrix of pixels, a first multiplier circuit (18) for multiplying the output from the image sensing element (5) output via an A/D converter (7) by horizontal linear correction data, a second multiplier circuit (19) for multiplying the product of the first multiplier circuit by vertical linear correction data, a selector (16) for selecting horizontal linear correction data, and a selector (17) for selecting vertical linear correction data. The device switches the selectors (16, 17) in accordance with the position (horizontal and vertical addresses) of the pixel of interest.

12 Claims, 16 Drawing Sheets

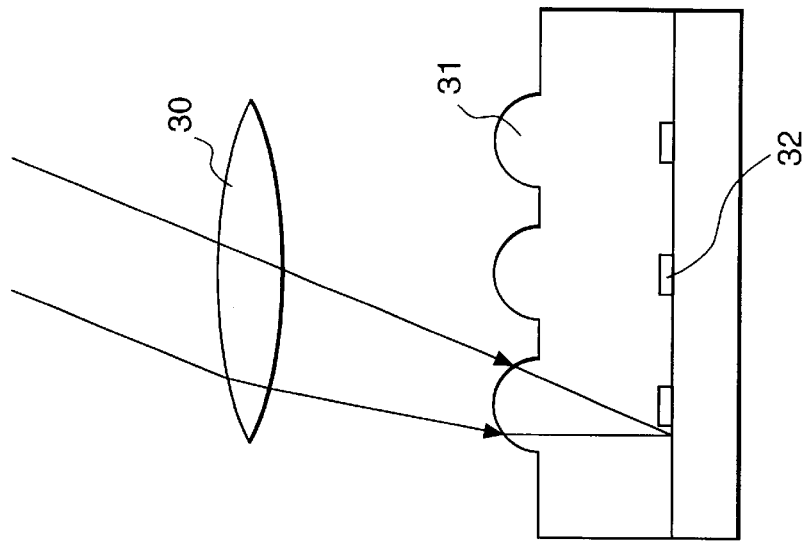
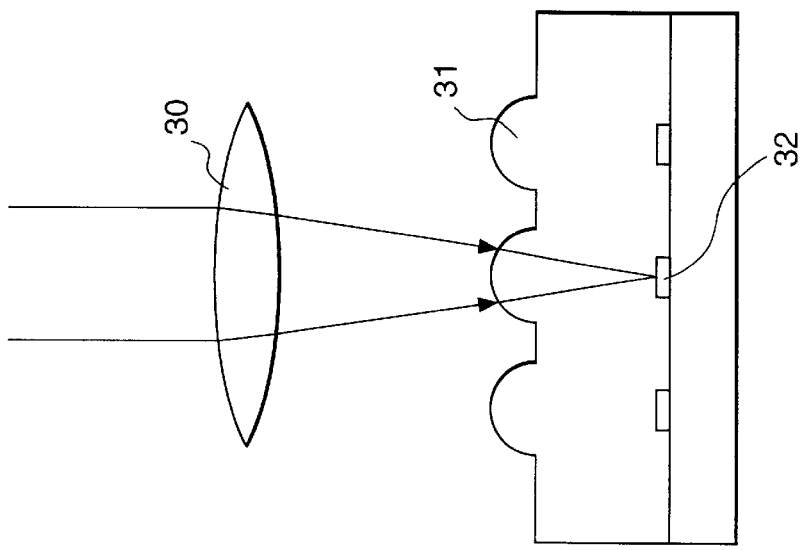

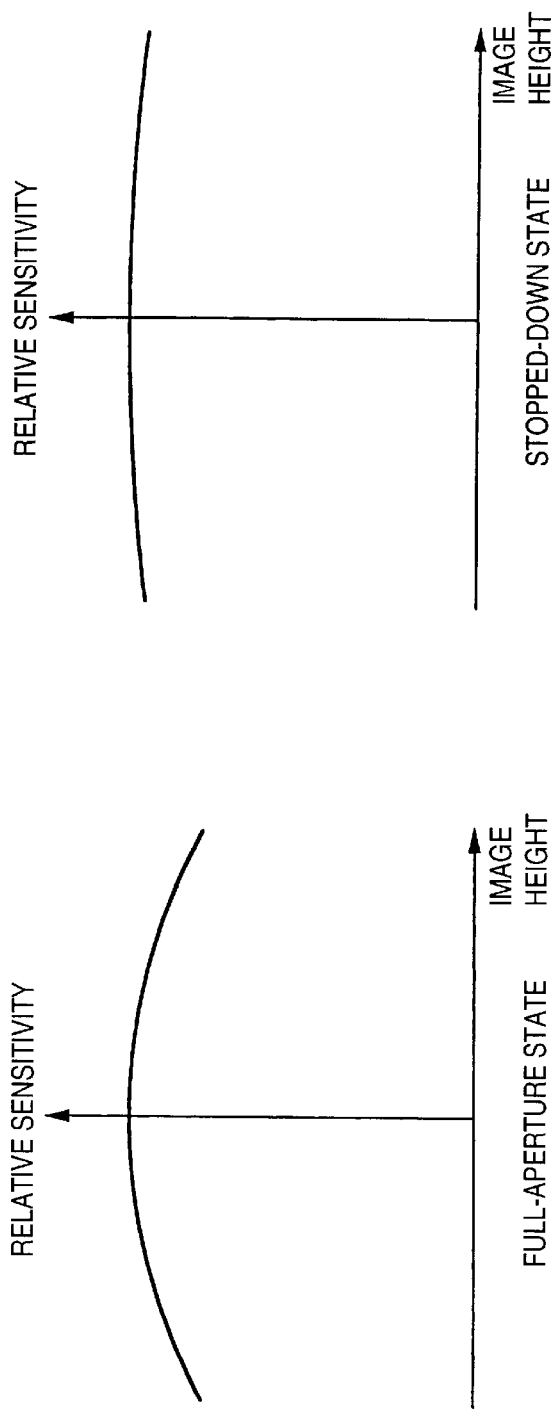

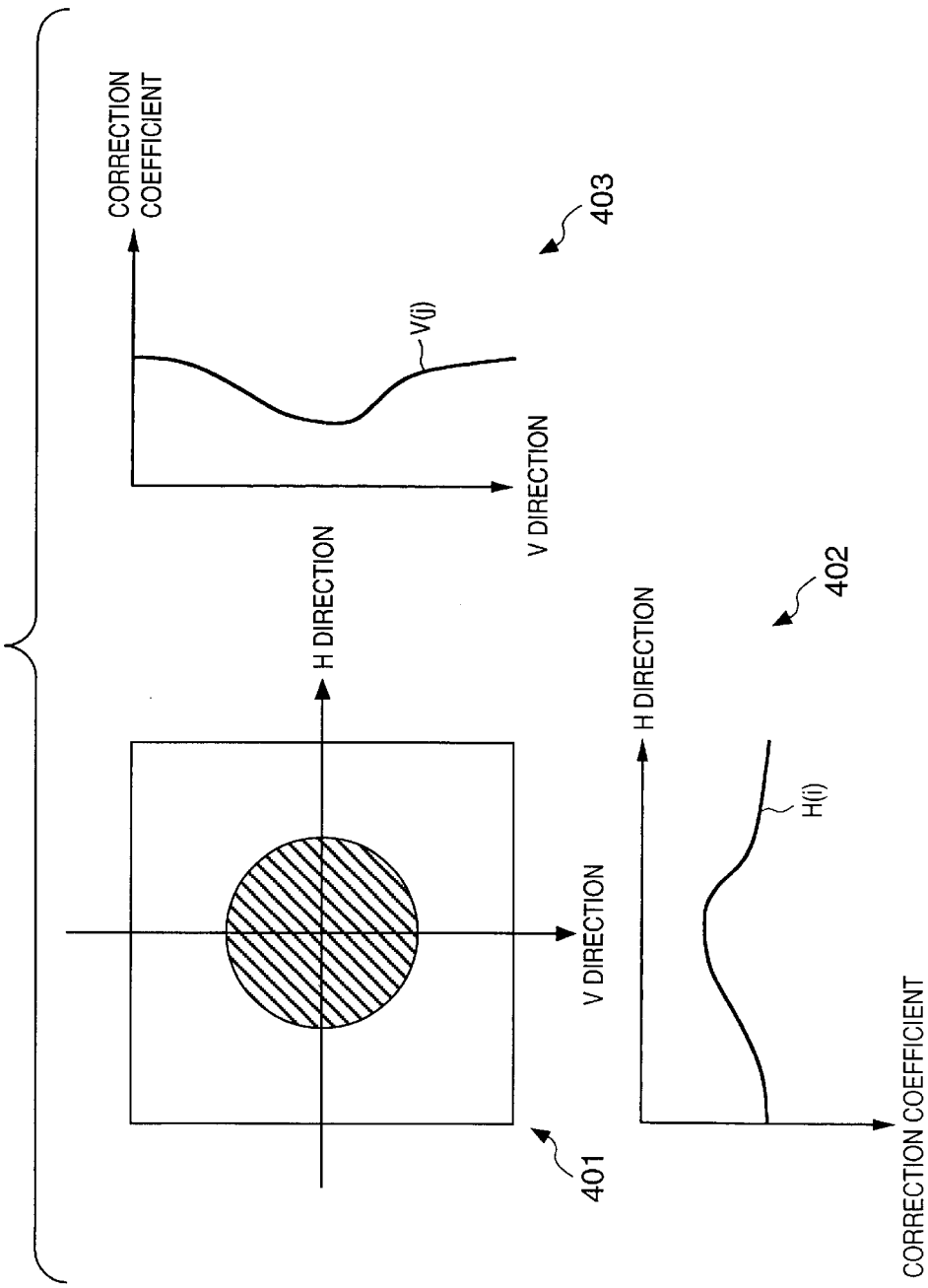

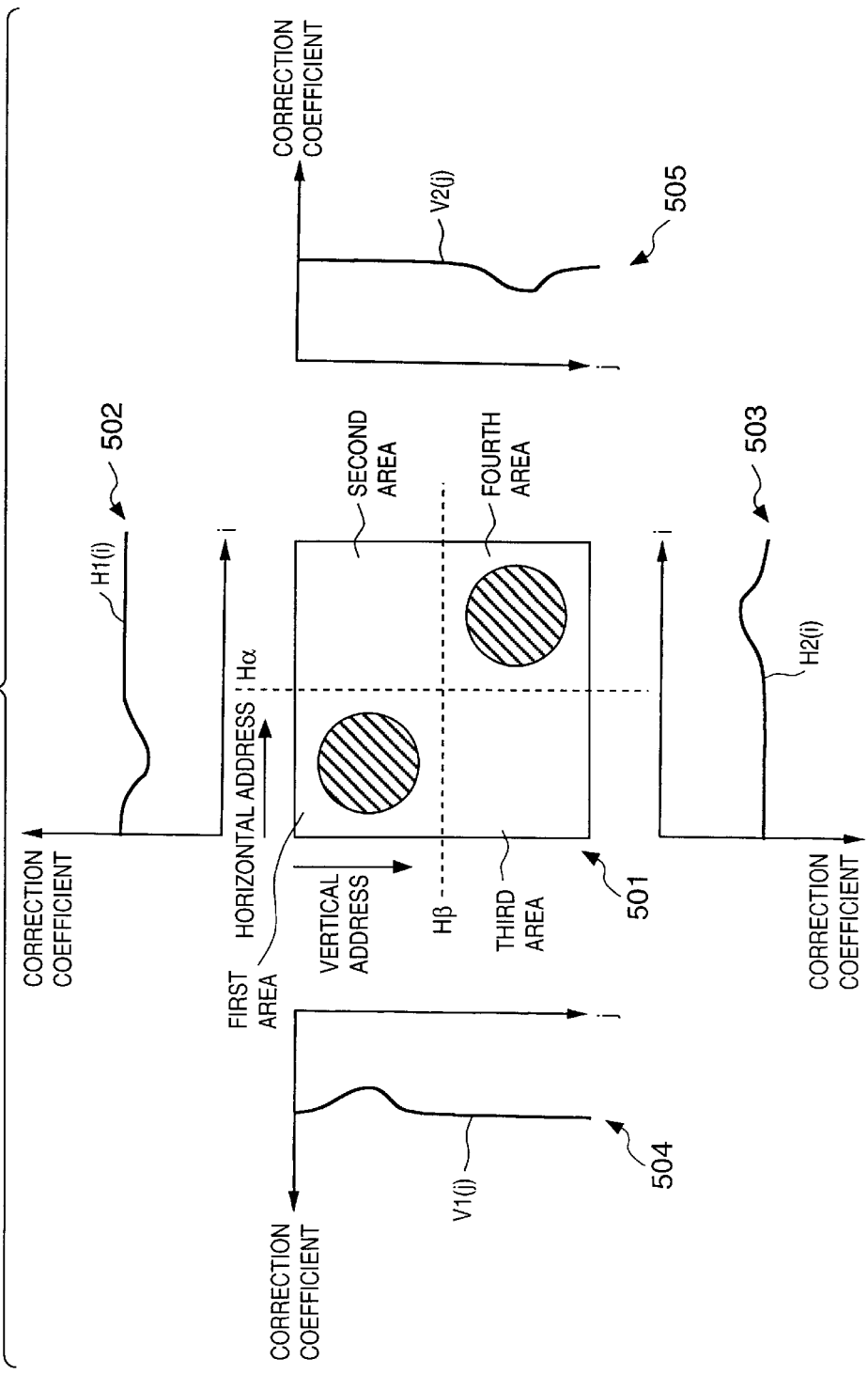

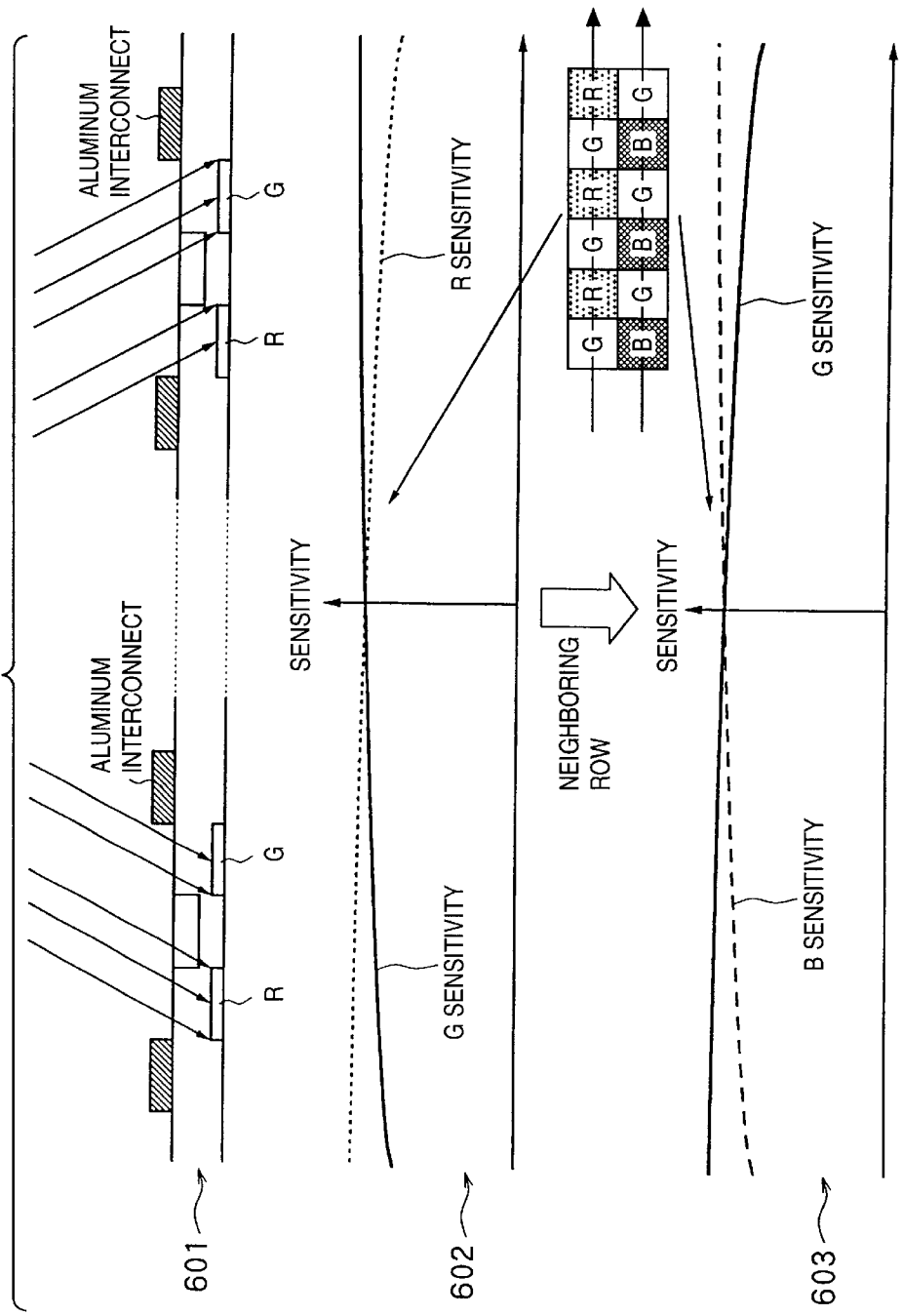

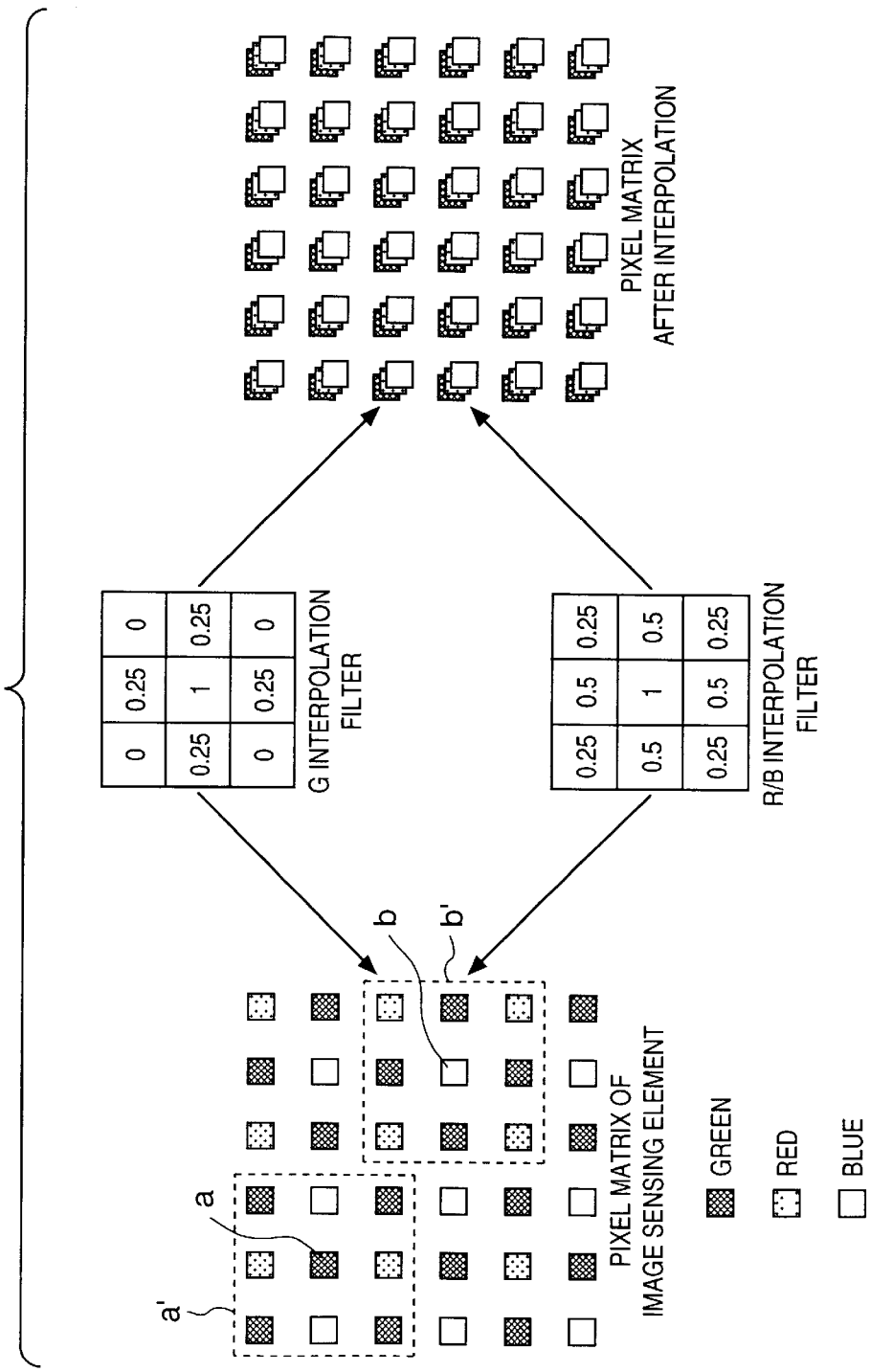

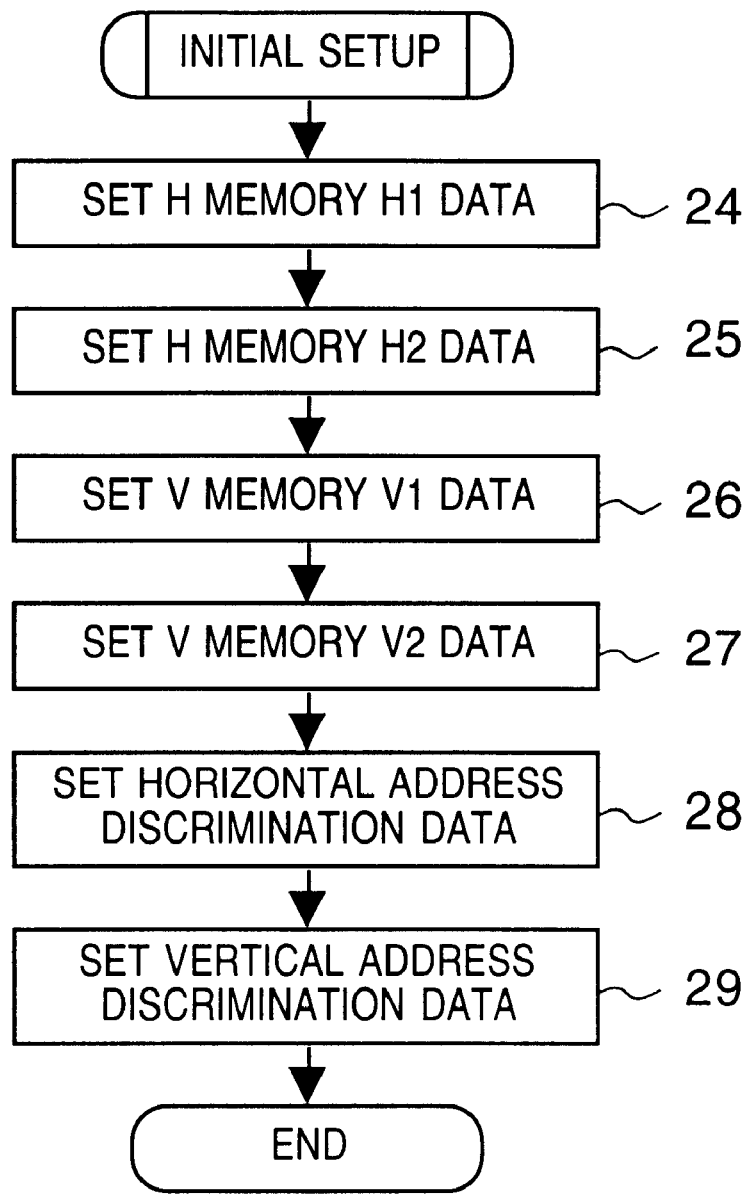

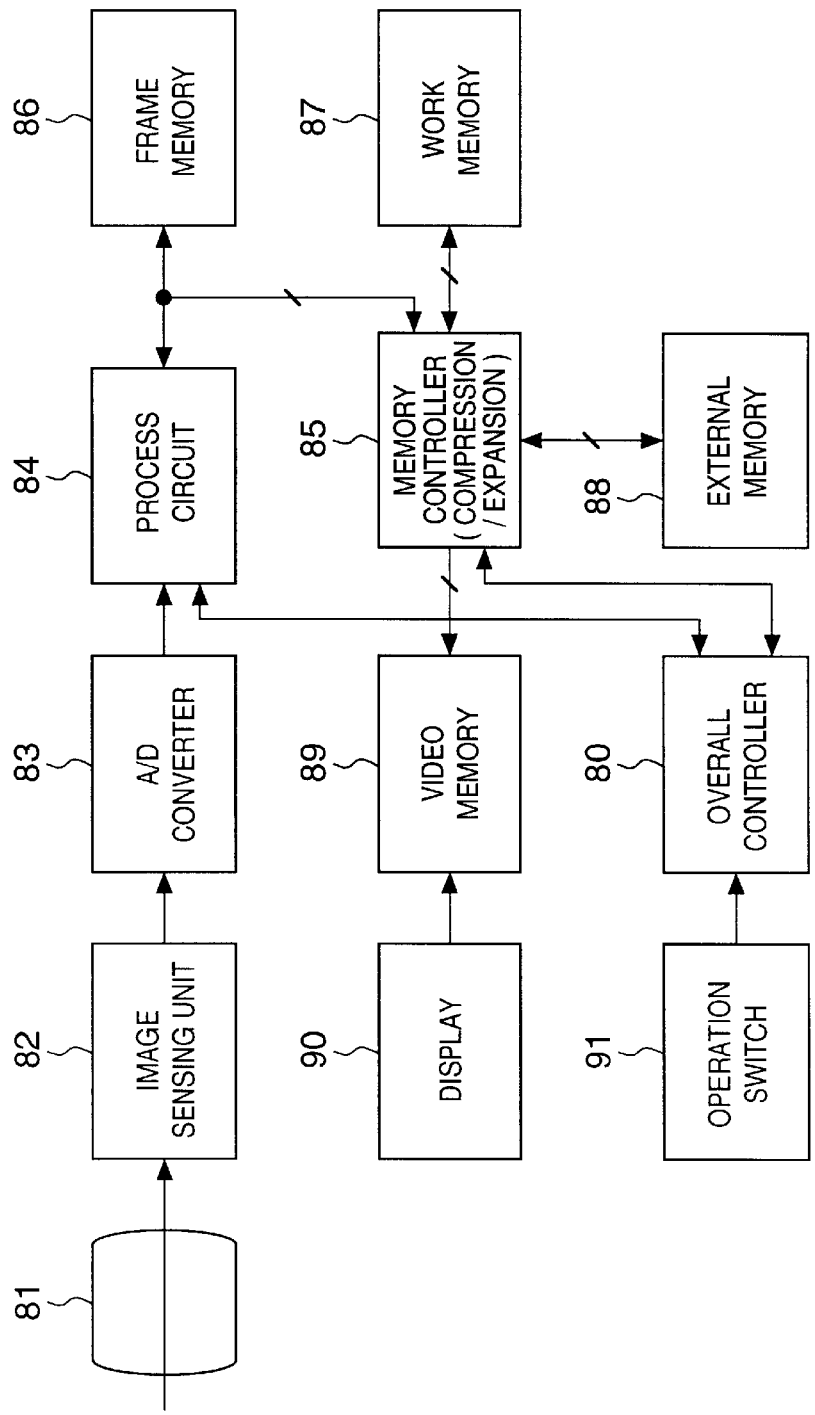

IMAGE SENSING DEVICE, IMAGE PROCESSING APPARATUS AND METHOD, AND MEMORY MEDIUM

FIELD OF THE INVENTION

The present invention relates to an image sensing device, an image processing apparatus and method, and a memory medium.

BACKGROUND OF THE INVENTION

FIG. 16 is a schematic block diagram showing the arrangement of a conventional digital still camera. In this digital camera, an overall control circuit 80 detects changes in state of operation switches (main switch, release switch, and the like) 91, and starts power supply to other blocks.

An object image within the photographing frame range is formed on the image sensing surface of an image sensing unit 82 via a main photographing optical system 81. The image sensing unit 82 converts this image into an analog electrical signal, and supplies it to an A/D converter 83 in turn in units of pixels. The A/D converter 83 converts the analog electrical signal into a digital signal, and supplies the digital signal to a process circuit 84.

The process circuit 84 generates R, G, and B image signals on the basis of the input data. In the state before photographing, these image signals are periodically transferred to a video memory 89 via a memory controller 85 in units of frames, thus displaying an image on a display unit 90. In this manner, a viewfinder display is implemented.

On the other hand, when the photographer operates one of operation switches 91 to instruct execution of photographing, pixel data for one frame output from the process circuit 84 are stored in a frame memory 86 in accordance with a control signal output from the overall control circuit 80. The data in the frame memory 86 are compressed by the memory controller 85 and a work memory 87 on the basis of a predetermined compression format, and the compression result is stored in an external memory (e.g., a nonvolatile memory such as a flash memory or the like) 88.

When the photographer reviews photographed images, the compressed data stored in the external memory 88 are read out, and are expanded by the memory controller 85 to be converted into normal data in units of photographing pixels. The conversion result is transferred to the video memory 89, and an image is displayed on the display unit 90.

In such digital camera, microlenses 31 shown in FIGS. 2A and 2B are provided to an image sensing element of the image sensing unit 32 in units of photosensitive pixels so as to improve optical sensitivity in units of pixels. In FIGS. 2A and 2B, reference numeral 30 denotes a photographing lens (main photographing optical system) as a field lens; and 32, each photosensitive section (light-receiving section) of the image sensing element.

Since the microlenses 31 are provided in units of photosensitive pixels of the image sensing element, even when the image sensing element has a narrow effective sensitivity range, marginal light can be effectively focused on photosensitive pixels.

When light rays have passed through the photographing lens 30 strike the image sensing element in a direction nearly parallel to the optical axis, as shown in FIG. 2A, incoming light rays focus on the photosensitive section 31 without posing any serious problem. However, when light rays obliquely enter the photographing lens 30, as shown in FIG. 2B, only some of the incoming light rays become incident on the photosensitive section 31 in an area (peripheral portion of the image sensing element) separated from the optical axis of the photographing lens 30.

Such light amount drop is normally called white shading. This phenomenon becomes conspicuous as the pixel position on the image sensing element separates farther away from the optical axis of the photographing lens, and also as the focal length of the photographing lens 30 decreases (in practice, as the distance from the image sensing element to the pupil position of the photographing lens becomes shorter).

FIGS. 3A and 3B are graphs showing changes in white shading when the stop of the photographing lens 30 has changed. FIGS. 3A and 3B respectively show the relationship between the image height and relative sensitivity on the image sensing element in a full-aperture state (FIG. 3A), and a stop-down state (FIG. 3B). In the full-aperture state of the stop, the relative sensitivity drops largely compared to the central portion with increasing height of an image formed on the image sensing element, since many light components that obliquely enter the photographing optical system are included, as shown in FIG. 2B.

On the other hand, when the stop is stopped down, the relative sensitivity changes little even when the image height becomes larger, since light components that obliquely enter the photographing lens 30 are suppressed by the stop effect.

As a method of correcting white shading produced by a combination of the photographing lens 30 and microlenses on the image sensing element, a method disclosed in Japanese Patent Laid-Open No. 9-130603 is known. In this method, assuming that each pixel position on the image sensing element is expressed by a pointer indicated by a horizontal direction X and vertical direction Y, shading correction data H(x) for one horizontal line, and shading correction data V(y) for one vertical line are used. The shading correction data for one horizontal line and one vertical line assume larger values as the pixel position approaches an end (periphery). A pixel S(i, j) on the image sensing element is multiplied by horizontal correction data H(i) and vertical correction data V(j) as per:

$$S(i, j) \times H(i) \times V(j) \rightarrow S(i, j)$$

In this way, sensitivity drop in the peripheral portion of the image sensing element due to shading is apparently prevented.

When a digital camera is constructed using the same optical system (e.g., exchangeable lens system) as that of a conventional single-lens reflex silver halide camera, an image sensing element having an image sensing area considerably larger than that of a normal image sensing element is required.

However, an image sensing element having such a large image sensing area often suffers a problem of sensitivity nonuniformity of color filters and the like, which is produced in the manufacture process. In view of the whole image sensing element, only a local area suffers a decrease or increase in sensitivity, which cannot be corrected by simply setting higher gains toward the periphery.

In FIG. 4, 401 indicates an example of the sensitivity distribution of the image sensing element, in which the central sensitivity is higher than the peripheral one. Such sensitivity nonuniformity can be corrected to some extent using the aforementioned conventional method.

For example, 402 in FIG. 4 expresses a function of horizontal sensitivity correction data H(i), which has smaller correction coefficient values at the central portion and larger ones at the periphery. On the other hand, 403 in FIG. 4 expresses a function of vertical sensitivity correction data V(j), which has smaller correction coefficient values at the central portion and larger ones at the periphery.

Therefore, correction can be done using such functions by calculating a value S(i, j) at each pixel point as per:

$$S(i, j) \times H(i) \times V(j) \rightarrow S(i, j)$$

However, when local sensitivity nonuniformity is present in a plurality of areas on the frame, as indicated by 501 in FIG. 5, it cannot be perfectly removed by the above-mentioned correction method that simply uses shading correction data H(x) for one horizontal line and shading correction data V(y) for one vertical line.

On the other hand, in the device structure of an image sensing element indicated by 601 in FIG. 6, since aluminum interconnects and the like run to sandwich, e.g., two sensitivity areas, the level of incoming light to one (G sensitivity area) of two sensitivity areas lowers in areas on the left side in FIG. 6, while one (R sensitivity area) of two sensitivity areas lowers in areas on the right side in FIG. 6. Therefore, the two sensitivity areas (G and R) have different sensitivity levels depending on the right and left areas of the frame of the image sensing element, as indicated by 602 in FIG. 6.

Likewise, in neighboring rows (rows in which G and R alternately appear), the sensitivity distribution changes, as indicated by 603 in FIG. 6. That is, in this case, since a Bayer matrix is assumed as a matrix of color filters, G sensitivity lowers to the right unlike the characteristics indicated by 602.

When colors are formed by combining R, G, and B with such characteristics, different color tones are obtained on the right, left, up, and down positions on the frame. Such phenomenon is generally called color shading, which is also produced by the aforementioned combination of the photographing lens and microlenses, in addition to the device structure.

Against such phenomenon, color unbalances cannot be sufficiently corrected by only combining the conventional linear correction data sequences H(i) and V(j).

SUMMARY OF THE INVENTION

The present invention has been made in consideration of the above situation, and has as its object to correct, e.g., sensitivity nonuniformity of an image sensing element.

More specifically, it is an object of the present invention to correct, e.g., local sensitivity nonuniformity of an image sensing element resulting from variations or the like of color filters provided to the image sensing element in the manufacture process.

It is another object of the present invention to correct sensitivity nonuniformity (e.g., color shading, white shading) of an image sensing element resulting from a combination of the device structure of the image sensing element and a photographing optical system.

It is still another object of the present invention to correct sensitivity nonuniformity (e.g., color shading, white shading) of an image sensing element resulting from a combination of the device structure of the image sensing element and a photographing optical system independently from a change in state of the photographing optical system.

Other objects of the present invention will be described in the embodiments of the present invention.

An image sensing device according to the first aspect of the present invention comprises an image sensing element having a two-dimensional matrix of pixels, first multiplier means for multiplying a row of an image sensed by the image sensing element by horizontal linear correction data, second multiplier means for multiplying a column of the image by vertical linear correction data, and change means for changing at least one of the horizontal and vertical linear correction data in accordance with a position of a pixel of interest in the image, and the first and second multiplier means correct a value of each pixel of the image.

In the image sensing device according to the first aspect of the present invention, for example, the image is preferably segmented into a plurality of partial areas, and the change means changes at least one of the horizontal and vertical linear correction data in accordance with the partial area to which the pixel of interest belongs.

In the image sensing device according to the first aspect of the present invention, for example, the image is preferably segmented into a plurality of partial areas, and the change means changes both the horizontal and vertical linear correction data in accordance with the partial area to which the pixel of interest belongs.

In the image sensing device according to the first aspect of the present invention, for example, the change means preferably has two different types of horizontal linear correction data, alternately switches the horizontal linear correction data in units of rows, and supplies the selected data to multiplication by the first multiplier means.

In the image sensing device according to the first aspect of the present invention, for example, the change means preferably has two different types of vertical linear correction data, alternately switches the vertical linear correction data in units of columns, and supplies the selected data to multiplication by the second multiplier means.

In the image sensing device according to the first aspect of the present invention, for example, the image sensing element preferably includes color filters in a Bayer matrix.

In the image sensing device according to the first aspect of the present invention, for example, the image is preferably segmented into a plurality of groups each of which is defined by an area as a two-dimensional matrix of a plurality of pixels, the device further comprises third multiplier means for multiplying each group by two-dimensional correction data given by a row and column, and the change means includes means for changing the two-dimensional correction data in accordance with the group to which the pixel of interest in the image belongs.

In the image sensing device according to the first aspect of the present invention, for example, the change means preferably includes means for changing at least one of the horizontal and vertical linear correction data in accordance with a state of a photographing optical system.

In the image sensing device according to the first aspect of the present invention, for example, the change means preferably includes means for changing at least one of the horizontal and vertical linear correction data in accordance with one of a focal length, field angle, and aperture of a photographing optical system or a combination thereof.

An image processing apparatus according to the second aspect of the present invention is an image processing apparatus for processing an image supplied from an image sensing element having a two-dimensional matrix of pixels, comprising first multiplier means for multiplying a row of an image sensed by the image sensing element by horizontal linear correction data, second multiplier means for multiplying a column of the image by vertical linear correction data, and change means for changing at least one of the horizontal and vertical linear correction data in accordance with a position of a pixel of interest in the image, wherein the first and second multiplier means correct a value of each pixel of the image.

An image processing method according to the third aspect of the present invention comprises the first multiplier step of multiplying a row of an image sensed by an image sensing element having a two-dimensional matrix of pixels by horizontal linear correction data, the second multiplier step of multiplying a column of the image by vertical linear correction data, and the change step of changing at least one of the horizontal and vertical linear correction data in accordance with a position of a pixel of interest in the image, and a value of each pixel of the image is corrected in the first and second multiplier steps.

A memory medium according to the fourth aspect of the present invention is a memory medium storing an image processing program, the program including the first multiplier step of multiplying a row of an image sensed by an image sensing element having a two-dimensional matrix of pixels by horizontal linear correction data, the second multiplier step of multiplying a column of the image by vertical linear correction data, and the change step of changing at least one of the horizontal and vertical linear correction data in accordance with a position of a pixel of interest in the image, wherein a value of each pixel of the image is corrected in the first and second multiplier steps.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A and 2B show a combination of an image sensing element and photographing optical system;

FIGS. 3A and 3B are graphs for explaining white shading;

FIG. 4 shows an example of the sensitivity distribution and correction of the image sensing element;

FIG. 5 is a view for explaining the method of correcting the sensitivity of the image sensing element according to the first embodiment of the present invention;

FIG. 6 is a view for explaining the device structure of the image sensing element and a phenomenon resulting from that structure;

FIG. 7 is a view for explaining the color filter matrix of the image sensing element and a color interpolation method;

FIG. 8 is a flow chart for explaining initial setup operation in the first and second embodiments of the present invention;

FIG. 16 is a block diagram for explaining the arrangement of a conventional camera.

DETAILED DESCRIPTION OF THE PREFERRED EMBODIMENTS

[First Embodiment]

Figure 1:
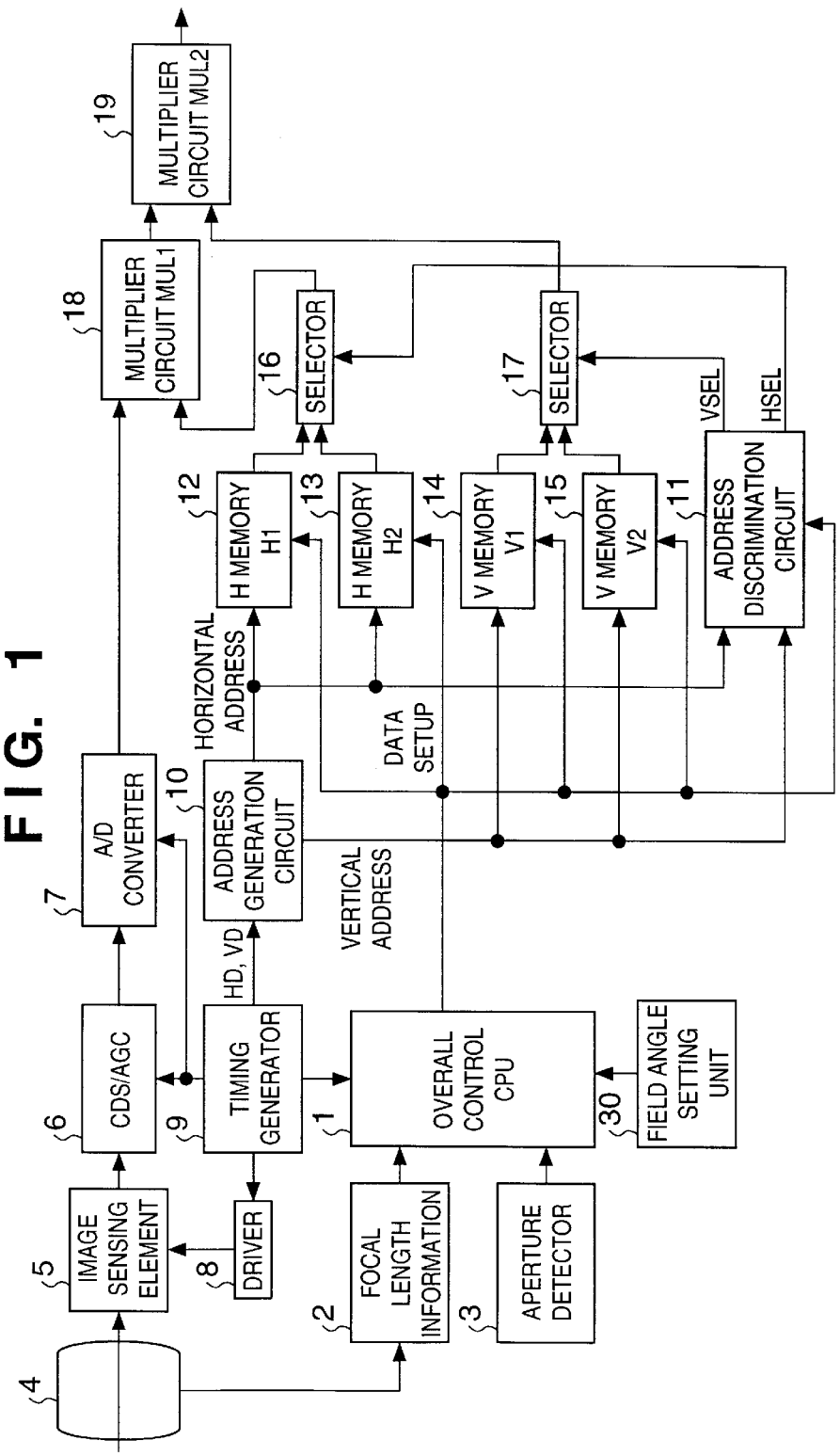
FIG. 1 is a block diagram showing the arrangement of a camera (image sensing device) according to the first and second embodiments of the present invention.

FIG. 1 is a block diagram showing the arrangement of a camera (image sensing device) according to a preferred embodiment of the present invention. Referring to FIG. 1, reference numeral 1 denotes an overall control CPU for controlling the overall camera. Reference numeral 2 denotes a focal length detector for detecting the focal length of a photographing optical system of the camera (or the pupil position of the photographing optical system). The detector 2 outputs encoded information corresponding to the focal length and supplies it to the CPU 1. Reference numeral 3 denotes an aperture detector for detecting the state of an aperture in the photographing optical system. The detector 3 outputs encoded information corresponding to the aperture state, and supplies it to the CPU 1.

Reference numeral 4 denotes a main photographing optical system (photographing lens) of the camera. Reference numeral 5 denotes an image sensing element for converting optical information as an object image formed by the main photographing optical system 4 into an electrical signal, and outputting the electrical signal. The image sensing element 5 comprises, e.g., a charge transfer element such as a CCD or the like.

Charges accumulated by the image sensing element 5 within a predetermined period of time are read in turn in units of pixels, and are supplied to a CDS/AGC circuit 6. The circuit 6 reduces noise components such as reset noise and the like produced by the image sensing element itself, amplifies the charge signal to an appropriate level, and supplies the signal to an A/D converter 7. The A/D converter 7 converts object luminance information corresponding to the charge amount into digital data. Since optical color filters for generating, e.g., R, G, and B color signals or the like are adhered onto the image sensing element 5, the output signals from the image sensing element 5 alternately represent the respective colors.

Reference numeral 8 denotes a driver circuit for actually driving the image sensing element 6. The driver circuit 8 supplies driving pulses to the image sensing element 5 at given periods on the basis of a timing signal supplied from a timing generator circuit 9.

The timing generator circuit 9 generates horizontal and vertical sync signals HD and VD and supplies them to an address generation circuit 10. The address generation circuit 10 generates address signals to be supplied to memories 12 to 15 connected to the output side of the circuit 10 on the basis of the horizontal and vertical sync signals HD and VD.

Reference numerals 12 to 15 denote memories for storing data used in sensitivity correction of the image sensing element. More specifically, reference numeral 12 denotes an H memory H1 for storing horizontal first correction data; 13, an H memory H2 for storing horizontal second correction data; 14, a V memory V1 for storing vertical first correction data; and 15, a V memory V2 for storing vertical second correction data.

Reference numeral 11 denotes an address discrimination circuit for outputting a select signal HSEL that selects the memory 12 or 13, and a select signal VSEL that selects the memory 14 or 15 on the basis of the signals supplied from the address generation circuit 10.

Reference numerals 16 and 17 denote selectors for respectively selecting the outputs from the memory 12 or 13 and the memory 14 or 15 on the basis of the select signals HSEL and VSEL supplied from the address discrimination circuit 11.

Reference numeral 18 denotes a first multiplier circuit (MUL1) for multiplying the output from the A/D converter 7 by horizontal correction data obtained via the selector 16. Reference numeral 19 denotes a second multiplier circuit (MUL2) for multiplying the output from the first multiplier circuit (MUL1) 18 by vertical correction data obtained via the selector 17.

The output value from the second multiplier circuit (MUL2) 19 is input to, e.g., a process circuit, and undergoes dark level correction, γ correction, color interpolation, and the like. After that, the processed data is stored in, e.g., a memory.

The color interpolation will be explained below with reference to FIG. 7. The pixel matrix (color filter matrix) of the image sensing element shown in FIG. 7 has a general Bayer matrix, in which G pixels are arranged in a checkerboard pattern, and R/B pixels are arranged line-sequentially. In case of a single-board image sensing element, since all pixels do not have RGB information, it is a common practice to generate RGB color information corresponding to each pixel position on the image sensing element by interpolation using 3×3 matrices illustrated at the center of FIG. 7.

In FIG. 7, a G interpolation filter is different from an R/B interpolation filter. For example, G data at position a is generated by respectively multiplying luminance data of pixels in area a', i.e., those of a pixel at position a and its eight surrounding pixels by coefficients of the G interpolation filter. In case of FIG. 7, since the coefficient for luminance data at position a corresponding to a G color filter is 1, and coefficients for upper, lower, and right and left neighboring luminance data are 0.25, but G data at those positions are zero, G data is determined by only the output value at position a.

On the other hand, G data at position b is generated by respectively multiplying luminance data of pixels in area b', i.e., those of a pixel at position b and its eight surrounding pixels by coefficients of the G interpolation filter. In this case, since G data at position b is zero, G data at position b is determined by the average value of its upper, lower, right, and left neighboring G data.

Likewise, R/B data for all pixel positions are determined using the R/B interpolation filter different from the G interpolation filter. In this manner, RGB data for all the pixel positions can be generated, as illustrated at the right end in FIG. 7.

The correction process in the camera shown in FIG. 1 will be explained below with reference to FIGS. 5, 8, and 9.

FIG. 8 is a flow chart showing the process for initially setting up data of the H memory (H1) 12, H memory (H2) 13, V memory (V1) 14, and V memory (V2) 15 and the address discrimination circuit 11 by the overall control CPU 1.

In step 24, a linear data sequence H1(i) indicated by a graph 502 in FIG. 5 is set (stored) in the H memory (H1) 12.

In step 25, a linear data sequence H2(i) indicated by a graph 503 in FIG. 5 is set (stored) in the H memory (H2) 13. These two data sequences H1(i) and H2(i) contain different data. These data are determined in accordance with the characteristics of the image sensing element 5 measured during the manufacturing process, and are prestored in the internal nonvolatile memory or the like of the overall control CPU 1. Note that i indicates the horizontal address. In 501 in FIG. 5, the left side corresponds to the lower horizontal address.

Likewise, a linear data sequence V1(j) indicated by a graph 504 in FIG. 5 is set (stored) in the V memory (V1) 14 in step 26, and a linear data sequence V2(j) indicated by a graph 505 in FIG. 5 is set (stored) in the V memory (V2) 15 in step 27. These two data sequences V1(j) and V2(j) also contain different data, which are determined in accordance with the characteristics of the image sensing element 5 measured during the manufacturing process, and are prestored in the internal nonvolatile memory or the like of the overall control CPU 1. Note that j indicates the vertical address. In 501 in FIG. 5, the upper side corresponds to the lower vertical address.

The position of each pixel of the image sensing element 5 is specified by horizontal and vertical addresses i and j. These horizontal and vertical addresses i and j are generated by the address generation circuit 10 in accordance with the horizontal and vertical sync signals HD and VD.

In steps 28 and 29, discrimination condition values used to discriminate the horizontal and vertical addresses generated by the address generation circuit 10 in the address discrimination circuit 11 in FIG. 1 are set.

The overall control CPU 1 transfers, as horizontal address discrimination data, horizontal address Hα indicated by 501 in FIG. 5 to the address discrimination circuit in step 28, and transfers, as vertical address discrimination data, Vβ indicated by 501 in FIG. 5 to the address discrimination circuit 11 in step 29. These two data Hα and Vβ are determined in accordance with the characteristics of the image sensing element 5 measured during the manufacturing process, and are prestored in the internal nonvolatile memory or the like of the overall control CPU 1.

Switching of correction data upon correcting data output from the A/D converter 7 in the first multiplier circuit (MUL1) 18 and second multiplier circuit (MUL2) 19 will be explained below with reference to FIG. 9. FIG. 9 is a flow chart showing the address discrimination process in the address discrimination circuit 11.

In this example, the first and third areas of the image sensing element 5 have central higher sensitivity portions due to variations of color filters and the like in the manufacture, as indicated by 501 in FIG. 5. In order to correct such sensitivity distribution, data sequences which have smaller correction coefficient values in correspondence with a higher filter sensitivity portion, and larger correction coefficient values in correspondence with a lower filter sensitivity portion.

Figure 9:
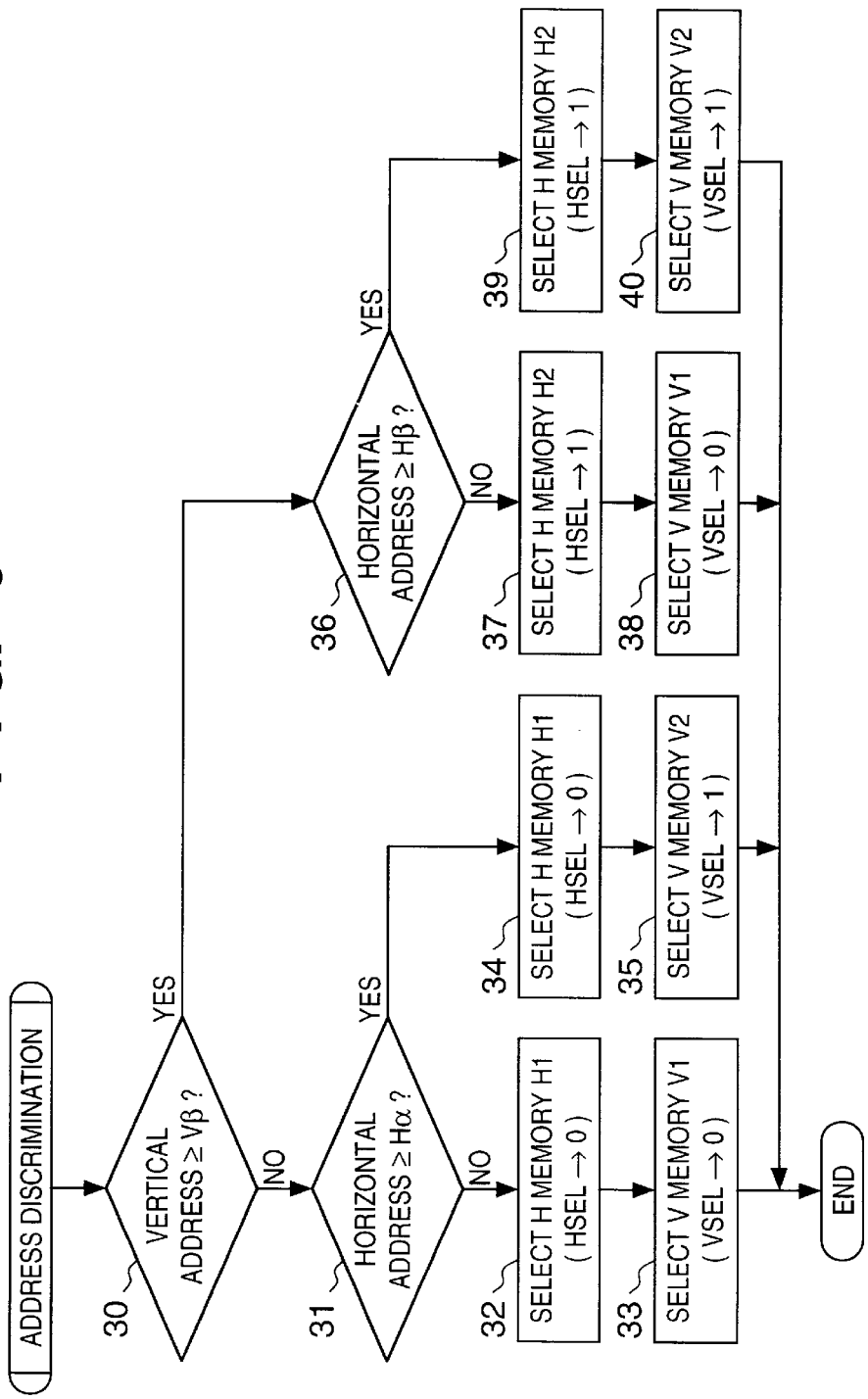
FIG. 9 is a flow chart for explaining correction operation according to the first embodiment of the present invention.

In steps 30, 31, and 36 in FIG. 9, one of the first to fourth effective areas of the image sensing element 5, to which the position of data (pixel) currently output from the A/D converter 7 belongs is determined on the basis of horizontal and vertical addresses i and j.

If the vertical address is smaller than Vβ and the horizontal address is smaller than Hα, it is determined that the data of interest belongs to the first area in 501 of FIG. 5, and the select signals HSEL and VSEL as the output signals from the address discrimination circuit 11 are respectively set at L level in steps 32 and 33. Correction data H1(i) stored in the H memory (H1) 12 is supplied to the first multiplier circuit (MUL1) 18 via the selector 16, and correction data V1(j) stored in the V memory (V1) 14 is supplied to the second multiplier circuit (MUL2) 19 via the selector 17. The correction process in this case is as follows.

In the first area, the first multiplier circuit (MUL1) 18 multiplies data output from the A/D converter 7 by horizontal correction data H1(i) corresponding to that horizontal address i. In this fashion, the horizontal sensitivity distribution is corrected (first-stage correction). Since the central portion of the first area has higher sensitivity, a data sequence which includes smaller correction coefficients in correspondence with a higher sensitivity portion of the image sensing element 5 than those of other portions, as indicated by the graph 502 in FIG. 5.

The second multiplier circuit (MUL2) 19 then multiplies the output from the first multiplier circuit (MUL1) 18 by vertical correction data V1(j) corresponding to vertical address j so as to correct the vertical sensitivity distribution of the first area (second-stage correction). This correction data V1(j) is supplied from the V memory (V1) 14 to the second multiplier circuit (MUL2) 19 via the selector 17. The correction data V1(j) corresponds to a data sequence which includes smaller correction coefficients in correspondence with a higher sensitivity portion of the image sensing element 5 than those of other portions, as indicated by the graph 504 in FIG. 5.

As described above, in this embodiment, individual pixels in the first area are multiplied by the horizontal linear correction data H1(i) and vertical linear correction data V1(j) to implement local sensitivity correction in the first area.

On the other hand, if it is determined in steps 30, 31, and 36 in FIG. 9 that the vertical address corresponding to data (pixel) currently output from the A/D converter 7 is smaller than Vβ and the horizontal address is equal to or larger than Hα, it is determined that the data of interest belongs to the second area. In this case, the select signals HSEL and VSEL as the output signals from the address discrimination circuit 11 are respectively set at L and H levels in steps 34 and 35. Correction data H1(i) stored in the H memory (H1) 12 is supplied to the first multiplier circuit (MUL1) 18 via the selector 16, and correction data V2(j) stored in the V memory (V2) 15 is supplied to the second multiplier circuit (MUL2) 19 via the selector 17. The correction process in this case is as follows.

In this example, the second area has a flat sensitivity distribution, as indicated by 501 in FIG. 5. Therefore, data in the second area undergo horizontal correction using data having horizontal addresses equal to or larger than Hα, i.e., data corresponding to flat characteristics, of the correction data H1(i) indicated by the graph 502 in FIG. 5. That is, as for the second area, the first multiplier circuit (MUL1) 18 multiplies data output from the A/D converter 7 by horizontal correction data H1(i) corresponding to that horizontal address i to implement horizontal correction (first-stage correction).

Also, as described above, since the second area has a flat sensitivity distribution, vertical correction is done using data having vertical addresses smaller than Vβ, i.e., data corresponding to flat characteristics, of correction data V2(j) indicated by the graph 505 in FIG. 5. That is, as for the second area, the second multiplier circuit (MUL2) 19 multiplies the output of the first-stage correction by vertical correction data V2(j) corresponding to vertical address j (second-stage correction).

In this manner, since the second area uses linear correction data V2(j) different from the first area as the vertical linear correction data, correction that matches the sensitivity distribution of the second area can be done even when the first area suffers sensitivity nonuniformity.

If it is determined in steps 30, 31, and 36 in FIG. 9 that the vertical address corresponding to data (pixel) currently output from the A/D converter 7 is equal to or larger than Vβ and the horizontal address is smaller than Hα in the discrimination process, it is determined that the data of interest belongs to the third area. In this case, the select signals HSEL and VSEL as the output signals from the address discrimination circuit 11 are respectively set at H and L levels in steps 37 and 38. Correction data H2(i) stored in the H memory (H2) 13 is supplied to the first multiplier circuit (MUL1) 18 via the selector 16, and correction data V1(j) stored in the V memory (V1) 14 is supplied to the second multiplier circuit (MUL2) 19 via the selector 17. The correction process in this case is as follows.

In this example, the third area has a flat sensitivity distribution, as indicated by 501 in FIG. 5. Therefore, data in the third area undergo horizontal correction using data having horizontal addresses smaller than Hα, i.e., data corresponding to flat characteristics, of the correction data H2(i) indicated by the graph 503 in FIG. 5. That is, as for the third area, the first multiplier circuit (MUL1) 18 multiplies data output from the A/D converter 7 by horizontal correction data H2(i) corresponding to that horizontal address i to implement horizontal correction (first-stage correction).

Also, as described above, since the third area has a flat sensitivity distribution, vertical correction is done using data having vertical addresses equal to or larger than Vβ, i.e., data corresponding to flat characteristics, of correction data V1(j) indicated by the graph 504 in FIG. 5. That is, as for the third area, the second multiplier circuit (MUL2) 19 multiplies the output of the first-stage correction by vertical correction data V1(j) corresponding to vertical address j (second-stage correction).

To summarize, since the third area uses linear correction data H2(i) different from the first area as the horizontal linear correction data, correction that matches the sensitivity distribution of the third area can be done even when the first area suffers sensitivity nonuniformity.

Furthermore, if it is determined in steps 30, 31, and 36 in FIG. 9 that the vertical address corresponding to data (pixel) currently output from the A/D converter 7 is equal to or larger than Vβ and the horizontal address is equal to or larger than Hα in the discrimination process, it is determined that the data of interest belongs to the fourth area. In this case, the select signals HSEL and VSEL as the output signals from the address discrimination circuit 11 are respectively set at H and H levels in steps 39 and 40. The correction process in this case is as follows.

In this example, the fourth area has a central higher sensitivity portion, as indicated by 501 in FIG. 5. Therefore, the fourth area uses data having horizontal addresses equal to or higher than Hα, i.e., data including smaller correction coefficients in correspondence with a higher sensitivity portion than those of other portions, of the correction data H2(i) indicated by the graph 503 in FIG. 5. That is, as for the fourth area, the first multiplier circuit (MUL1) 18 multiplies data output from the A/D converter 7 by horizontal correction data H2(i) corresponding to that horizontal address i to implement horizontal correction (first-stage correction).

Also, as described above, since the fourth area has a central higher sensitivity portion, data having vertical addresses smaller than Vβ, i.e., data including smaller correction coefficients in correspondence with a higher sensitivity portion than those of other portions, of correction data V2(j) indicated by the graph 505 in FIG. 5. That is, as for the fourth area, the second multiplier circuit (MUL2) 19 multiplies the output of the first-stage correction by vertical-correction data V2(j) corresponding to vertical address j (second-stage correction).

In this manner, since the fourth area uses linear correction data H2(i) different from the first and second areas in the horizontal direction, and linear correction data V2(j) different from the first and third areas in the vertical direction, correction that matches the sensitivity distribution of the fourth area can be done.

Local sensitivity nonuniformity of the image sensing element resulting from variations of color filters and the like produced in the manufacturing process is highly likely to occur at a plurality of portions in the effective area of the image sensing element. Such problem becomes more serious with increasing area of the image sensing element. In order to improve the yield of the image sensing element, it is important to correct such sensitivity nonuniformity.

Hence, like in this embodiment, since at least two different types of horizontal linear correction data are prepared, at least two different types of vertical linear correction data are prepared, and those data are selectively used, local sensitivity nonuniformity which is likely to occur in a plurality of areas of the image sensing element can be corrected without preparing correction data for one frame.

In this embodiment, two addresses Hα and Vβ are used as addresses used upon switching correction data. However, the number of addresses may be increased.

For example, the horizontal address as the boundary between the first and second areas may be set at Hα1, and the horizontal address as the boundary between the third and fourth areas may be set at Hα2. Likewise, the vertical address as the boundary between the first and third areas may be set at Vβ1, and the vertical address as the boundary between the second and fourth areas may be set at Vβ2.

Alternatively, the effective area of the image sensing element 5 may be segmented into smaller partial areas (e.g., a total of nine areas; three in the horizontal direction and three in vertical direction), and appropriate linear correction data may be assigned to those partial areas.

To restate, according to this embodiment, the sensitive area of the image sensing element is segmented into a plurality of areas, and the output from the image sensing element is corrected in units of areas by combining one of at least two horizontal linear correction data, and one of at least two vertical linear correction data. In this way, even when the image sensing element suffers a plurality of local sensitivity nonuniformity portions resulting from, e.g., sensitivity nonuniformity of color filters, appropriate sensitivity correction can be done without individually preparing correction data for all pixels.

[Second Embodiment]

Figure 10:
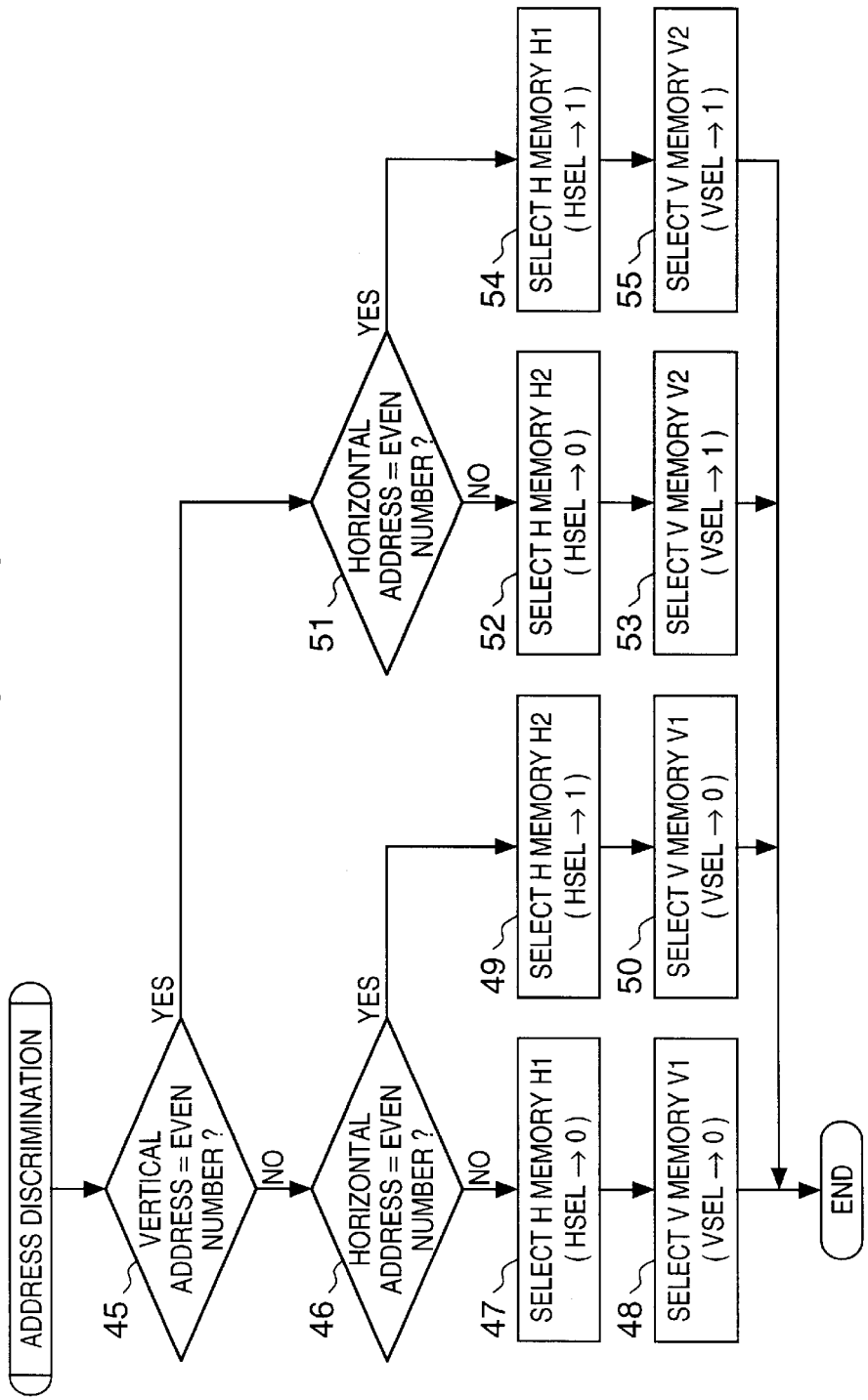
FIG. 10 is a flow chart for explaining correction operation according to the second embodiment of the present invention.

The second embodiment of the present invention will be described below with reference to FIGS. 6, 10, and 11. Note that items that are not touched upon in this embodiment invoke the first embodiment.

When the image sensing element 5 has a device structure (section) indicated by 601 in FIG. 6, the incident angle the incoming light makes with the image sensing element 5 becomes larger as the pixel position becomes closer to the peripheral portion of the image sensing element 5. Therefore, neighboring pixels have different incoming light amounts. This phenomenon becomes more conspicuous as the pixel position separates farther from the optical axis, and is observed in both the horizontal and vertical directions.

In a direction parallel to the direction of the section of 601, the sensitivity (output) of a pixel group located at odd positions counted from the edge, and the sensitivity (output) of a pixel group located at even positions have opposite characteristics, as indicated by 602 and 603 in FIG. 6. If the structure indicated by 601 is formed in both the horizontal and vertical directions, the characteristics at odd and even positions are different in both the horizontal and vertical directions.

Therefore, in this embodiment, in order to correct such characteristics, correction characteristics for the output data from the image sensing element 5 are changed depending on whether the position (address) of the pixel of interest is an odd or even position in the horizontal direction, and an odd or even position in the vertical direction. FIG. 10 is a flow chart showing the process in the address discrimination circuit 11 shown in FIG. 1.

In steps 45, 46, and 51, the address discrimination circuit 11 executes a discrimination process on the basis of the horizontal and vertical addresses output from the address generation circuit 10 in correspondence with data (pixel) output from the A/D converter 7. If vertical address j of data (pixel) currently output from the A/D converter 7 is an odd number (i.e., an odd row in the matrix of the two-dimensional image sensing element 5) and horizontal address i is an odd number (i.e., an odd column in the matrix of the two-dimensional image sensing element 5), the flow advances to step 47.

In step 47, the address discrimination circuit 11 sets the output HSEL at L level. As a result, the data sequence H1(i) in the H memory (H1) 12 is supplied to the first multiplier circuit (MUL1) 18 via the selector 16. In step 48, the address discrimination circuit 11 sets the output VSEL at L level. As a result, the data sequence V1(j) in the V memory (V1) 14 is supplied to the second multiplier circuit (MUL2) 19 via the selector 17.

This state will be explained below with reference to FIG. 11. Note that 1101 depicts the two-dimensional matrix of light-receiving elements in the image sensing element 5. Assuming that the pixel of interest at that time is a G pixel 1101a at the upper left corner in FIG. 11, i.e., if both horizontal and vertical addresses i and j are odd numbers, the first multiplier circuit (MUL1) 18 corrects data of the pixel 1101a in accordance with the horizontal correction data H1(i) indicated by the solid curve of a graph 1102 in FIG. 11. Also, the second multiplier circuit (MUL2) 19 further corrects the data of the pixel 1101a in accordance with the characteristics of the vertical correction data V1(j) indicated by the solid curve of a graph 1104 in FIG. 11.

Assume that the pixel of interest is a pixel (R) 1101b that neighbors the pixel 1101a. In this case, since horizontal address i is an even number and vertical address j is an odd number, the address discrimination circuit 11 sets the output HSEL at H level in step 49. As a result, the data sequence H2(i) in the H memory (H2) 13 is supplied to the first multiplier circuit (MUL1) 18 via the selector 16. In step 50, the address discrimination circuit 11 sets the output VSEL at L level. As a result, the data sequence V1(j) in the V memory (V1) is supplied to the multiplier circuit (MUL2) via the selector 17.

This state will be explained below with reference to FIG. 11. The first multiplier circuit (MUL1) 18 corrects the pixel 1101b in accordance with the characteristics of horizontal correction data H2(i) indicated by the dotted curve of a graph 1102 in FIG. 11. The second multiplier circuit (MUL2) 19 corrects the pixel 1101b in accordance with the characteristics of vertical correction data V1(j) indicated by the solid curve of a graph 1105 in FIG. 11.

Figure 11:
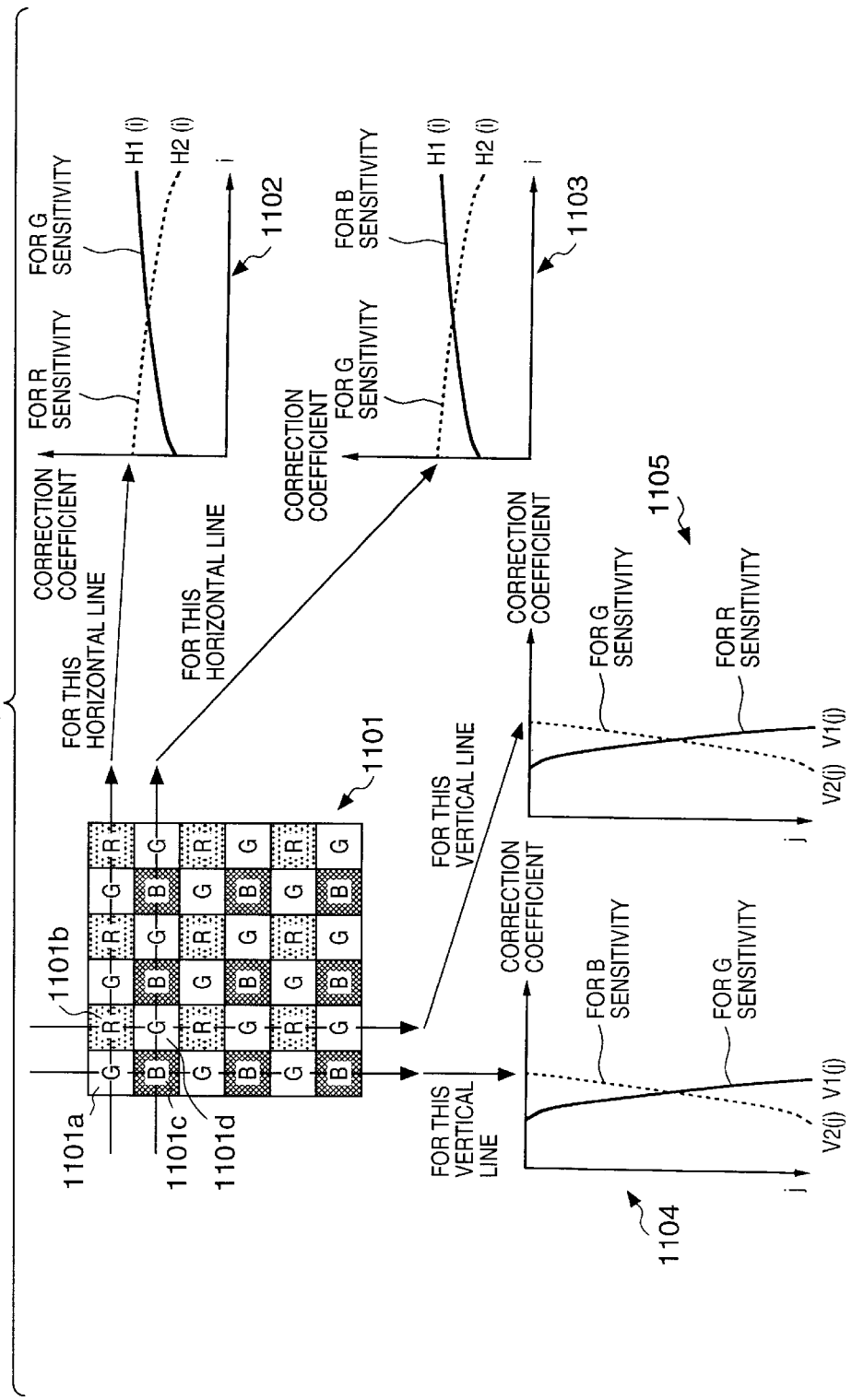
FIG. 11 is a view for explaining the concept of sensitivity correction according to the second embodiment of the present invention.

In this manner, correction data are selected for pixels G (1101a)→R (1101b)→G→R→ . . . in the uppermost line of the matrix 1101 in FIG. 11 to implement correction.

In the second uppermost line of the matrix 1101 in FIG. 11, since a leftmost pixel (B) 1101c has even vertical address j and odd horizontal address i, the address discrimination circuit 11 sets HSEL at L level in step 52. As a result, the data sequence H1(i) in the H memory (H1) 12 is supplied to the first multiplier circuit (MUL1) 18 via the selector 16. In step 53, the address discrimination circuit 11 sets VSEL at H level. As a result, the data sequence V2(j) in V memory (V2) 15 is supplied to the second multiplier circuit (MUL2) 19 via the selector 17.

This state will be explained below with reference to FIG. 11. The first multiplier circuit (MUL1) 18 corrects the pixel 1101c in accordance with the characteristics of horizontal correction data H1(i) indicated by the solid curve of a graph 1103 in FIG. 11. The second multiplier circuit (MUL2) 19 further corrects the pixel 1101c in accordance with the characteristics of the vertical correction data V2(j) indicated by the dotted curve in a graph 1104 in FIG. 11.

Assume that the pixel of interest is a pixel (G) 1101d that neighbors the pixel 1101c. In this case, since both horizontal and vertical addresses i and j are even numbers, the address discrimination circuit 11 sets HSEL at H level in step 54. As a result, the data sequence H2(i) in the H memory (H2) 13 is supplied to the first multiplier circuit (MUL1) via the selector 16. In step 55, the address discrimination circuit 11 sets VSEL at H level. As a result, the data sequence V2(j) in the V memory (V2) 15 is supplied to the second multiplier circuit (MUL2) 19 via the selector 17.

This state will be explained below with reference to FIG. 11. The first multiplier circuit (MUL1) 18 corrects the pixel 1101d in accordance with the characteristics of horizontal correction data H2(i) indicated by the dotted curve of the graph 1103 in FIG. 11. The second multiplier circuit (MUL2) 19 further corrects the pixel 1101d in accordance with the characteristics of the vertical correction data V2(j) indicated by the dotted curve in the graph 1105 in FIG. 11.

In this manner, correction data are selected for pixels B (1101c)→G (1101d)→B→G→B→ in the second uppermost line of the matrix 1101 in FIG. 11 to implement correction.

As described above, according to this embodiment, since horizontal correction data is switched depending on whether the horizontal address is an even or odd value, and vertical correction data is switched depending on whether the vertical address is an even or odd value, color shading due to different incoming light amounts on neighboring pixels in the image sensing element with the device structure indicated by 601 in FIG. 6 can be prevented.

In the above-mentioned embodiment, two different types of linear correction data are used in each of the horizontal and vertical directions. However, the present invention is not limited to this. For example, one or a plurality of correction data may be used in units of R, G, and B. Alternatively, when complementary color filters are used as color filters, for example, four different types of correction data may be used in each of the horizontal and vertical directions.

According to this embodiment, each horizontal line is grouped (into, e.g., even and odd lines) and each vertical line is grouped (into, e.g., even and odd lines) in accordance with the device structure of the image sensing element and the layout of the photographing optical system, and different linear correction data are applied to these groups to correct the output from the image sensing element. In this manner, color shading or the like produced by a combination of the device structure of the image sensing element and the photographing optical system can be corrected.

[Third Embodiment]

The third embodiment of the present invention will be described below with reference to FIGS. 12, 13, and 14.

This embodiment relates to a correction method that accurately removes both white shading produced by a combination of a main photographing optical system and microlenses on an image sensing element, and sensitivity nonuniformity produced by variations of color filters on the image sensing element in the manufacture process.

Figure 12:
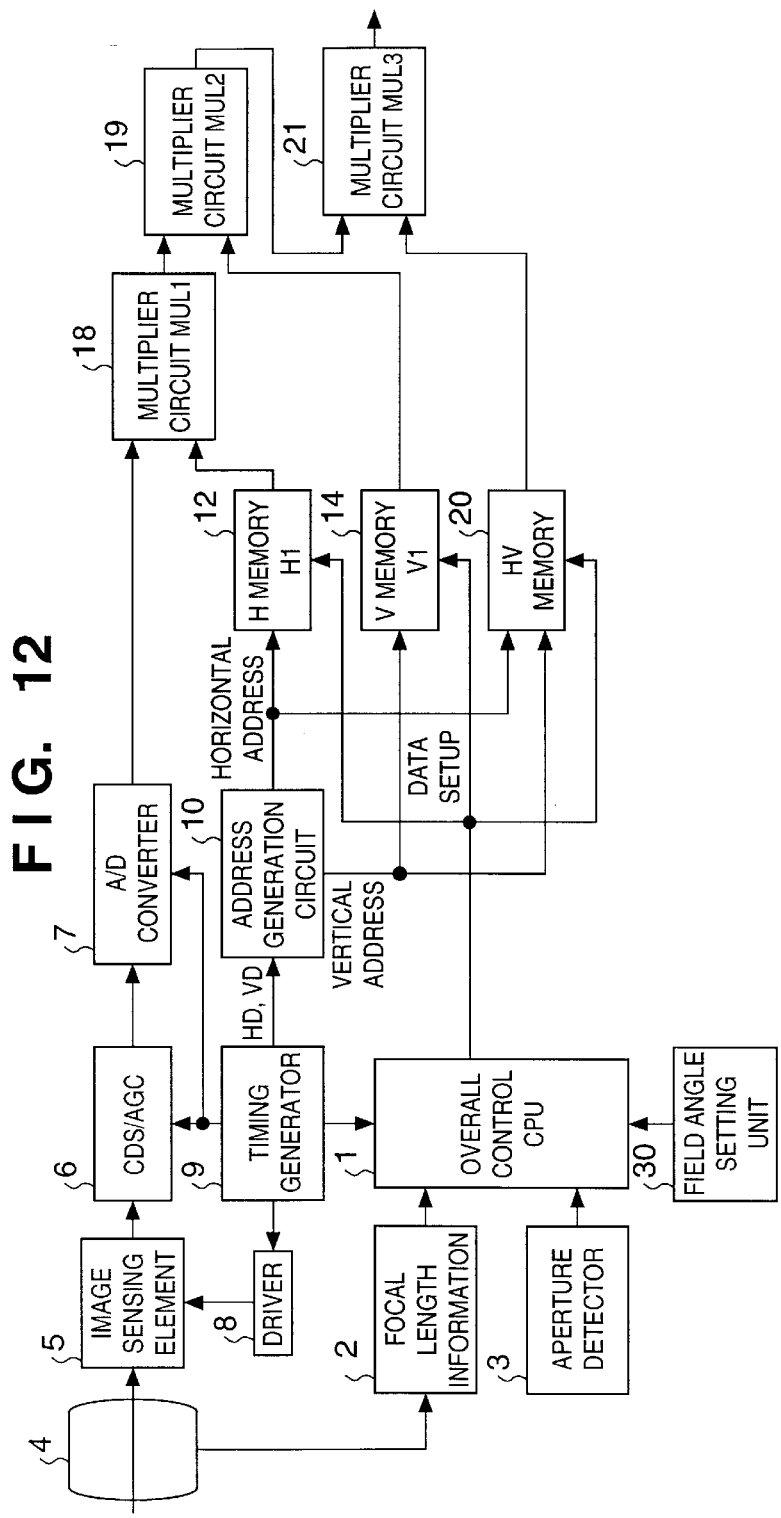
FIG. 12 is a block diagram showing the arrangement of a camera (image sensing device) according to the third embodiment of the present invention.

FIG. 12 is a block diagram showing the arrangement of a camera (image sensing device) according to the third embodiment of the present invention. This camera has an arrangement to which an HV memory 20 and third multiplier circuit (MUL3) 21 are added to that of the camera shown in FIG. 1, and from which the H memory (H2) 13, V memory (V2) 15, address discrimination circuit 11, and selectors 16 and 17 are omitted.

Figure 13:
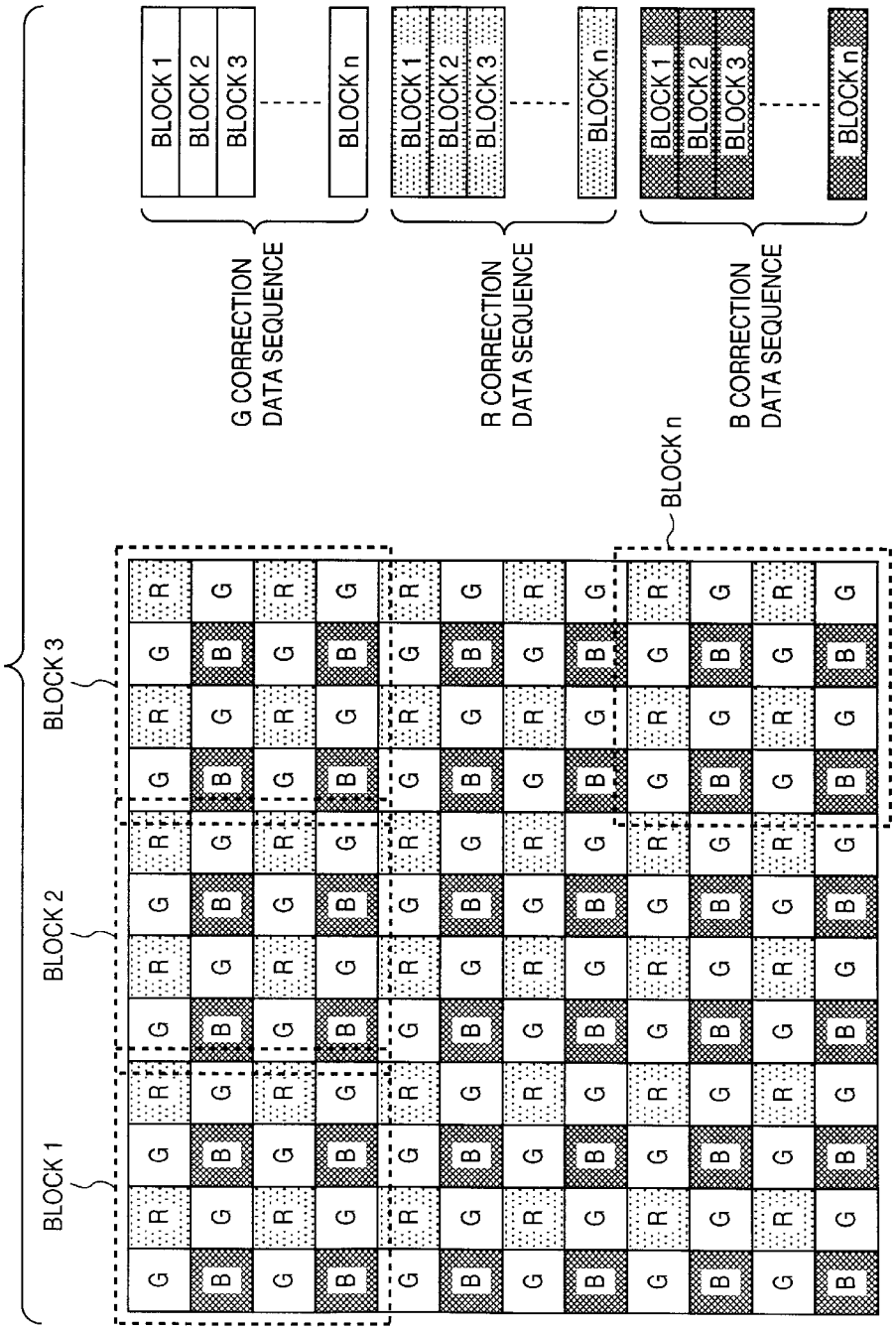
FIG. 13 is a view for explaining the concept of sensitivity correction according to the third embodiment of the present invention.
Figure 14:
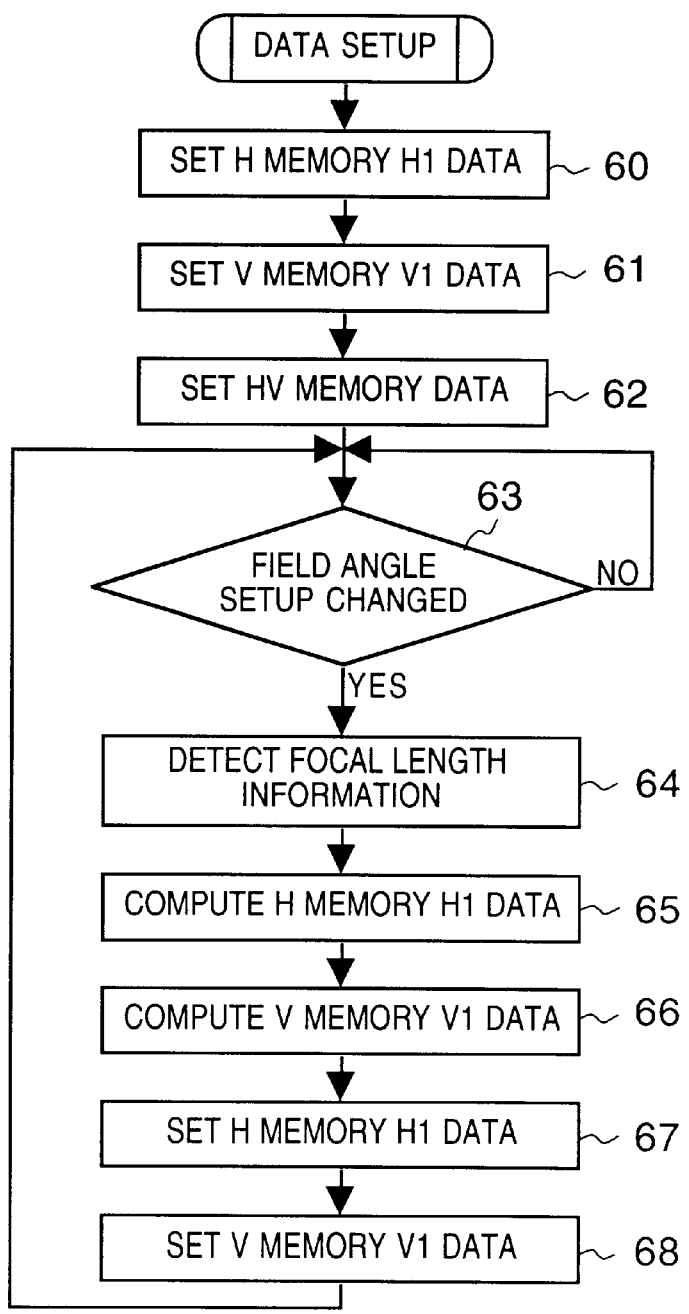
FIG. 14 is a flow chart for explaining correction operation according to the third embodiment of the present invention.

The HV memory 20 stores R, G, and B correction data in units of blocks, which are defined for the two-dimensional matrix of the image sensing element 5 in units of predetermined areas each consisting of a plurality of pixels, as shown in FIG. 13. For example, a filter matrix on the left side in FIG. 13 indicates a so-called Bayer matrix, and each block bounded by the dotted line include eight G components, and four each R/B components, and sensitivity correction data for this portion use identical values in units of colors.

As indicated by the right side in FIG. 13, as a G correction data sequence, correction data corresponding to block 1, correction data corresponding to block 2, . . . , correction data corresponding to last block n are successively stored in the HV memory 20. An R/B correction data sequence has a similar data sequence. Therefore, local sensitivity nonuniformity resulting from color filters and the like can be corrected using the HV memory 20 having a memory size smaller than correction data for all pixels of the image sensing element 5.

In general, the characteristics of sensitivity nonuniformity produced by variations of color filters or the like in the manufacture process remain the same even when the optical conditions or the like of the photographing optical system have changed. However, since the characteristics of the aforementioned white shading components change when the focal length (strictly, pupil position) of the photographing optical system has changed, the value must be re-set.

The correction process in this embodiment will be explained below with reference to the flow chart in FIG. 14.

In step 60, correction data to be set in the H memory (H1) 12 is read out from the internal nonvolatile memory of the overall control CPU 1, and is stored in the H memory (H1) 12. In step 61, correction data to be set in the V memory (V1) 14 is read out from the internal nonvolatile memory of the overall control CPU 1, and is stored in the V memory (V1) 14. Note that the correction data to be set in the H memory (H1) 12 and V memory (V1) 14 are the same as the linear correction data explained in the first embodiment, i.e., are determined in accordance with the characteristics of the image sensing element 5 measured during the manufacturing process, and are prestored in the internal nonvolatile memory of the overall control CPU 1.

In step 62, the aforementioned correction data in units of blocks 1 to n of the image sensing element are read out from the internal nonvolatile memory of the overall control CPU 1 and are stored in the HV memory 20. These data are also determined in accordance with the characteristics of the image sensing element 5 measured during the manufacturing process, and are prestored in the internal nonvolatile memory of the overall control CPU 1.

With these setups, the first multiplier circuit (MUL1) 18 multiplies the output from the A/D converter 7 by the value from the H memory (h1) 12 output by designating horizontal address i by the address generation circuit 10. Then, the second multiplier circuit (MUL2) 19 multiplies the output from the first multiplier circuit (MUL1) 18 by the value of the V memory (V1) 14 output by designating vertical address j by the address generation circuit 10. With the two operations, the influences of white shading or the like produced by a combination of the photographing lens 4 and the microlenses of the image sensing element 5 can be corrected.

Furthermore, the third multiplier circuit (MUL3) 21 multiplies the output from the second multiplier circuit (MUL2) 19 by the value of the HV memory 20 output by designating the horizontal and vertical addresses by the address generation circuit 10. The HV memory 20 stores correction data corresponding to the individual blocks of the two-dimensional matrix of the image sensing element 5, as described above. With the correction data, local sensitivity nonuniformity of color filters of the image sensing element 5 can be corrected.

It is checked in step 63 if a field angle setting unit 30 shown in FIG. 12 (e.g., a zoom operation button or the like) is operated by the operator. If NO in step 63, this step repeats itself; if YES in step 63, the flow advances to step 64.

In step 64, the focal length information value output from the focal length information detector 2 is read. The overall control CPU 1 re-computes correction data to be stored in the H memory (H1) 12 and that to be stored in the V memory (V1) 14 in accordance with predetermined functions, as shown in, e.g., FIG. 15.

Figure 15B:
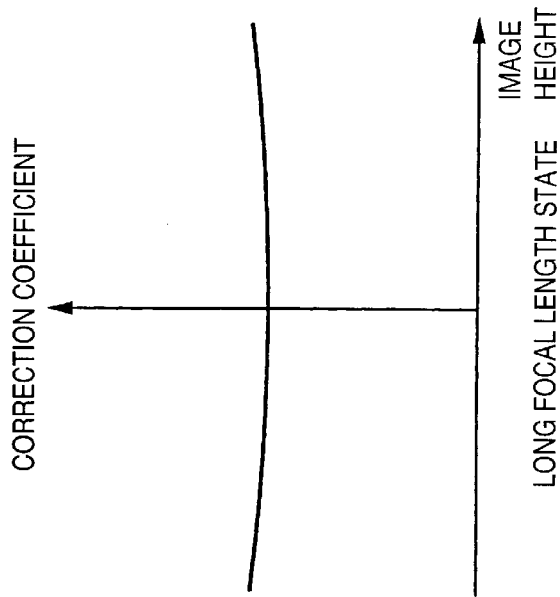
FIGS. 15A and 15B are views for explaining the sensitivity correction method according to the third embodiment of the present invention.
Figure 15A:
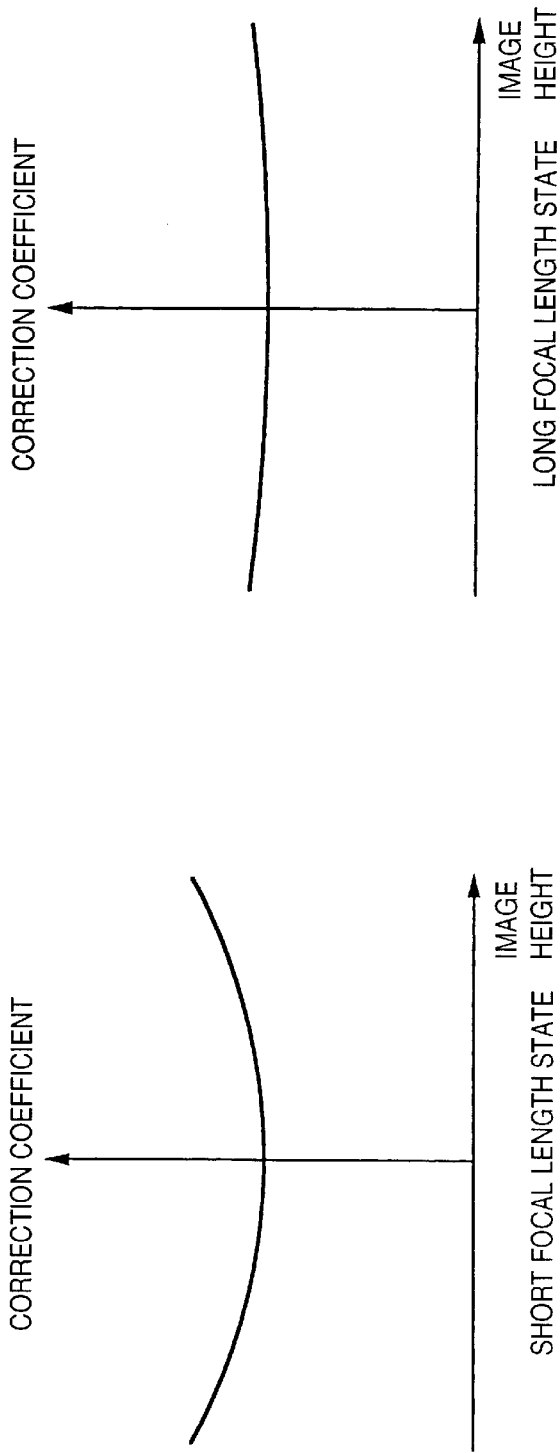

In FIG. 15, since the incoming light amount at the peripheral portion of the frame decreases with decreasing focal length, correction coefficients (gains) for the peripheral portion are set to be larger than those for the central portion. On the other hand, since the incoming light amount at the peripheral portion of the frame changes little with increasing focal length, the difference between the correction coefficients for the peripheral portion and those for the central portion is set to be small.

Therefore, in steps 65 and 66, new correction data are obtained by a method of multiplying the correction data sequence by a coefficient (a function using the focal length as a variable) that changes with respect to the focal length to have a predetermined relationship, a method of preparing, as a table, correction data sequences in correspondence with focal lengths in the internal nonvolatile memory or the like of the overall control CPU 1, and selecting the correction data sequence corresponding to the current focal length from this table, or the like. The obtained new correction data are re-set in the H memory (H1) and V memory (V1), and the flow returns to step 63.

As described above, in this embodiment, sensitivity nonuniformity of the image sensing element, which is determined depending on the state of the photographing optical system, is corrected using the horizontal and vertical linear data sequences, while sensitivity nonuniformity or the like of color filters produced at the time of manufacture of the image sensing element is corrected using the correction data sequence assigned units of blocks each consisting of a plurality of pixels. Also, components which are determined depending on the state of the photographing optical system are corrected by re-setting correction data in correspondence with the state of the optical system when the state (e.g., the focal length, pupil position, aperture, or the like) of the photographing optical system has changed.

According to this embodiment, since the output from the image sensing element is corrected by combining linear correction data in the horizontal and vertical directions of the image sensing element, and correction data determined in units of blocks each consisting of a plurality of pixels in the two-dimensional directions of the image sensing element, both white shading mainly produced due to the influence of the optical system, and local sensitivity nonuniformity of, e.g., color filters produced in the manufacture process of the image sensing element can be corrected.

[Other Embodiments]

Note that the present invention may be applied to either a system constituted by a plurality of devices, or an apparatus consisting of a single equipment.

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

According to the present invention, for example, sensitivity nonuniformity of the image sensing element can be satisfactorily corrected.

As many apparently widely different embodiments of the present invention can be made without departing from the spirit and scope thereof, it is to be understood that the invention is not limited to the specific embodiments thereof except as defined in the claims.

What is claimed is:

1. An image sensing device comprising:
    an image sensing element having a two-dimensional matrix of pixels;
    a memory arranged to store horizontal linear correction data and vertical linear correction data, at least one of the horizontal linear correction data and the vertical linear correction data being stored plural sets in said memory, the set number of the horizontal linear correction data being less than the row number of said image sensing element and the set number of the vertical linear correction data being less than the column number of said image sensing element;
    a first multiplier which multiplies a row of an image sensed by said image sensing element by the horizontal linear correction data;
    a second multiplier which multiplies a column of the image by the vertical linear correction data; and
    a change portion which changes at least one of the horizontal and vertical linear correction data to be respectively used by said first and second multipliers by selecting it from the plural sets in accordance with a position of a pixel of interest in the image, wherein said first and second multipliers correct a value of each pixel of the image.

2. The device according to claim 1, wherein the image is segmented into a plurality of partial areas, and said change portion changes at least one of the horizontal and vertical linear correction data in accordance with the partial area to which the pixel of interest belongs.

3. The device according to claim 1, wherein the image is segmented into a plurality of partial areas, and said change portion changes both the horizontal and vertical linear correction data in accordance with the partial area to which the pixel of interest belongs.

4. The device according to claim 1, wherein said memory stores two sets of horizontal linear correction data, and said change portion alternately switches the horizontal linear correction data in units of rows, and supplies the selected data to said first multiplier.

5. The device according to claim 4, wherein said memory stores two sets of vertical linear correction data, and said change portion alternately switching the vertical linear correction data in units of columns, and supplies the selected data to said second multiplier.

6. The device according to claim 5, wherein said image sensing element includes color filters in a Bayer matrix.

7. A image sensing device comprising:
an image sensing element having a two-dimensional matrix of pixels;
a first multiplier which multiplies a row of an image sensed by said image sensing element by the horizontal linear correction data, the image being segmented into a plurality of groups each of which is defined by an area as a two-dimensional matrix of a plurality of pixels;
a second multiplier which multiplies a column of the image by the vertical linear correction data;
a third multiplier which multiplies each group by two-dimensional correction data given by a row and column, said first, second, and third multipliers correcting a value of each pixel of the image,
a change portion which changes at least one of the horizontal and vertical linear correction data in accordance with a position of a pixel of interest in the image and changes the two-dimensional correction data in accordance with the group to which the pixel of interest in the image belongs.

8. The device according to claim 1, wherein said change portion includes a portion which changes at least one of the horizontal and vertical linear correction data in accordance with a state of a photographing optical system.

9. The device according to claim 1, wherein said change portion includes a portion which changes at least one of the horizontal and vertical linear correction data in accordance with one of a focal length, field angle, and aperture of a photographing optical system or a combination thereof.

10. An image processing apparatus for processing an image supplied from an image sensing element having a two-dimensional matrix of pixels, the apparatus comprising:
a memory arranged to store horizontal linear correction data and vertical linear correction data, at least one of the horizontal linear correction data and the vertical linear correction data being stored plural sets in said memory, the set number of the horizontal linear correction data being less than the row number of said image sensing element and the set number of the vertical linear correction data being less than the column number of the said image sensing element;
a first multiplier which multiplies a row of an image sensed by said image sensing element by the horizontal linear correction data;
a second multiplier which multiplies a column of image by the vertical linear correction data; and
a change portion which changes at least one of the horizontal and vertical linear correction data to be respectively used by said first and second multipliers by selecting it from the plural sets in accordance with a position of a pixel of interest in the image,
wherein said first and second multipliers correct a value of each pixel of the image.

11. An image processing method comprising:
the first multiplier step of multiplying a row of an image sensed by an image sensing element having a two-dimensional matrix of pixels by horizontal linear correction data;
the second multiplier step of multiplying a column of the image by vertical linear correction data, wherein at least one of the horizontal linear correction data and the vertical linear correction data being stored plural sets in a memory, the set number of the horizontal linear correction data being less than the row number of the image sensing element and the set number of the vertical linear correction data being less than the column number of the image sensing element; and
the change step of changing at least one of the horizontal and vertical linear correction data to be used in the first and second multiplier steps by selecting it from the plural sets stored in the memory in accordance with a position of a pixel of interest in the image,
wherein a value of each pixel of the image is corrected in the first and second multiplier steps.

12. A memory medium storing an image processing program, said program including:
the first multiplier step of multiplying a row of an image sensed by an image sensing element having a two-dimensional matrix of pixels by horizontal linear correction data;
the second multiplier step of multiplying a column of the image by vertical linear correction data, wherein at least one of the horizontal linear correction data and the vertical linear correction data being stored plural sets in a memory, the set number of the horizontal linear correction data being less than the row number of the image sensing element and the set number of the vertical linear correction data being less than the column number of the image sensing element; and
the change step of changing at least one of the horizontal and vertical linear correction data to be used in the first and second multiplier steps by selecting it from the plural sets stored in the memory in accordance with a position of a pixel of interest in the image,
wherein a value of each pixel of the image is corrected in the first and second multiplier steps.

* * * * *

UNITED STATES PATENT AND TRADEMARK OFFICE
CERTIFICATE OF CORRECTION

PATENT NO. : 6,707,955 B1
DATED : March 16, 2004
INVENTOR(S) : Yasuhiko Shiomi

It is certified that error appears in the above-identified patent and that said Letters Patent is hereby corrected as shown below:

Column 2,
Line 45, should read -- $S(i,j) \times H(j) \times V(j) \rightarrow S'(i,j)$ --

Column 3,
Line 10, should read -- $S(i,j) \times H(j) \times V(j) \rightarrow S'(i,j)$ --

Signed and Sealed this

Thirty-first Day of August, 2004

JON W. DUDAS
*Director of the United States Patent and Trademark Office*